March 15, 1955 A. E. WETHERBEE, JR 2,703,959
VARIABLE FLOW NOZZLE
Filed July 19, 1951

INVENTOR
ARTHUR E. WETHERBEE, JR
BY Leonard F. Weklind
ATTORNEY ns of the United States Patent Office 2,703,959
Patented Mar. 15, 1955

2,703,959

VARIABLE FLOW NOZZLE

Arthur E. Wetherbee, Jr., Newington, Conn., assignor to United Aircraft Corporation, East Hartford, Conn., a corporation of Delaware Application July 19, 1951, Serial No. 237,546

5 Claims. (Cl. 60—35.6)

This invention relates to gas turbine power plants and more particularly to means for controlling the exhaust gases issuing from the power plant.

It is an object of this invention to provide a simple but effective means for varying the effective area of the exhaust nozzle of a gas turbine power plant.

It is a further object of this invention to provide means for varying the effective area of an exhaust nozzle for a turbine power plant while maintaining substantially constant the actual area of the exhaust opening.

These and other objects will become readily apparent from the following detailed description of the drawing in which.

Although a number of variable area exhaust nozzle mechanisms for gas turbine power plants have been developed, each of these use the common expedient of actually varying the size of the exhaust opening by various types of well-known mechanisms. These mechanisms usually add considerable weight to the power plant and require a large number of cumbersome parts. This invention achieves the same result without actually varying the size of the exhaust nozzle opening and with a minimum number of parts.

Figure 1:
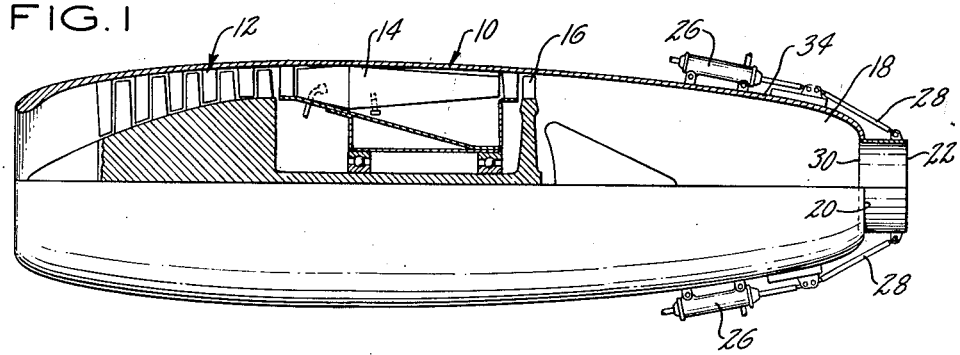
Fig. 1 is a partial cross-sectional schematic illustration of a gas turbine including the exhaust nozzle control of this invention.

Referring to Fig. 1, a gas turbine power plant is generally indicated at 10 having a compressor section 12, a combustion section 14, a turbine 16 for driving the compressor and an exhaust nozzle 18 which terminates in an opening 20. According to this invention then, a sleeve 22 is carried by the nozzle 18 and forms an extension of the nozzle 18 and the opening 20. The inner diameter of the sleeve 22 is substantially equivalent to the opening 20 so that no restriction of flow from the latter exists.

Figure 2:
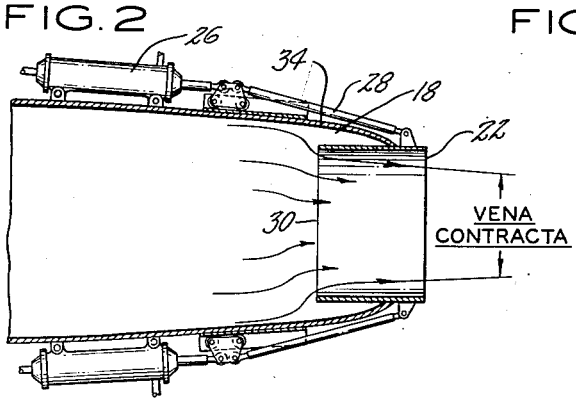
Fig. 2 is a partial cross-sectional view of the exhaust nozzle of Fig. 1 illustrating the exhaust gas control in its retracted position.

Fluid operated piston-cylinder combinations 26 may be provided which are operatively connected to the sleeve 22 by means of linkage 28 so as to move the sleeve 22 to a retracted position as illustrated in Fig. 2. In the position illustrated in Fig. 2, the upstream end 30 of the sleeve 22 is spaced from the adjacent wall 34 of the nozzle 18. In this position the sleeve 22 cooperates with the adjacent wall 34 of the nozzle to form what is known as a Borda mouthpiece. It is well-known in the field of fluid mechanics that a smooth orifice will have a coefficient of discharge of approximately .97 while a Borda mouthpiece has a flow coefficient of approximately .53. These flow coefficients are known in the art and are referred to, for example, in the Mechanical Engineers Hand Book by L. S. Marks, fourth edition, on page 225.

As illustrated in Fig. 2, when the sleeve 22 is retracted within the nozzle 18 a vena contracta is formed in the fluid as illustrated as a result of the forming of a Borda mouthpiece by the sleeve 22 and the wall 34 of the nozzle.

It is then apparent that in the position shown in Fig. 1 the sleeve 22 will provide a maximum flow coefficient while in the position shown in Fig. 2 the flow coefficient through the exhaust nozzle will be reduced by better than one-half. Of course, intermediate flow coefficients can be effected by retracting the sleeve 22 into the nozzle to less than the maximum.

With a construction of this type it is apparent that very little power will be required to move the sleeve 22 into its varied positions while also the external lines of the power plant are not substantially altered.

Figure 3:
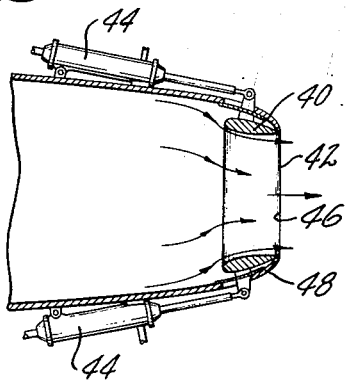
Figs. 3 and 4 illustrate a modified type of nozzle control in two of its operative positions, respectively.
Figure 4:
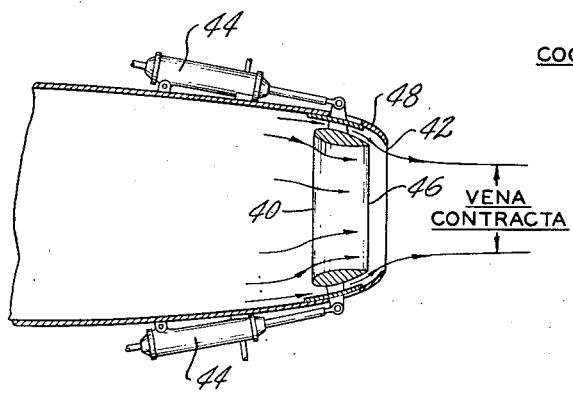

Referring to Figs. 3 and 4, a modified type of mechanism is illustrated whereby a vena contracta can be formed in the exhaust stream to vary the effective but not the actual area of the exhaust nozzle opening. In this modification a ring 40 is provided adjacent the exhaust nozzle opening 42. The ring 40 is of substantially streamline cross section and has an internal diameter substantially equivalent to that of the opening 42. In the position shown in Fig. 3 the ring 40 cooperates with the opening 42 to form a smooth rounded nozzle. Under these conditions maximum flow through the opening 42 is obtained. The ring 40 is operatively connected to one or more piston-cylinder combinations 44 so that the ring 40 may be moved in an upstream direction as illustrated in Fig. 4. In this position the trailing edge 46 of the ring 40 is spaced from the opening 42 while a gap also exists between the ring 40 and the nozzle wall 48. In this position a portion of the exhaust stream passes between the ring 40 and the wall 48 and is ejected transversely of the axis of flow so as to form a vena contracta in the stream adjacent the opening 42. The Fig. 4 construction is effectively an orifice and would have a discharge coefficient such as normally expected of sharp edged orifices.

Figure 5:
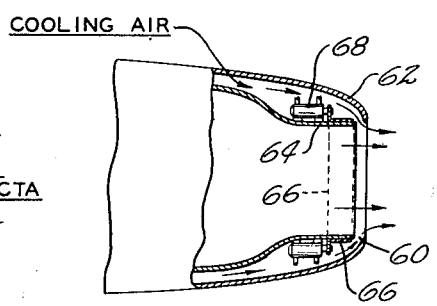
Figs. 5 and 6 are partial cross-sectional views illustrating another modification of this invention.
Figure 6:
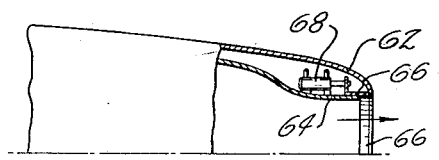

Figs. 5 and 6 illustrate another modification similar in principle excepting that engine cooling air, as illustrated, might be utilized for ejection through an annular slot 60 formed between an outer casing 62 and the nozzle 64. A sliding ring 66 surrounds the nozzle 64 and is slidable axially of the nozzle so as to close the annular slot 60. A piston-cylinder combination 68 is utilized to move the sleeve 66 to its various positions. Thus, as illustrated in Fig. 6, a maximum flow coefficient through the nozzle 64 will be obtained while, as illustrated in Fig. 5, the cooling air which is ejected via the slot 60 will cause a vena contracta in the exhaust stream thereby reducing the flow coefficient.

Although several embodiments of this invention have been illustrated and described herein, it will be apparent that various changes and modifications may be made in the arrangement and construction of the various parts without departing from the scope of this novel concept.

What it is desired to obtain by Letters Patent is:

1. In a gas turbine power plant having an exhaust nozzle, said nozzle having a wall converging in a downstream direction and terminating in an opening, the combination of means for varying the effective area of said opening while maintaining the actual area thereof substantially constant comprising a sleeve located in the nozzle adjacent said opening and substantially defining the minimum cross section of said nozzle, said sleeve being movable between the position where its upstream end is in juxtaposed relation with said nozzle wall adjacent said opening and the position where its upstream end is upstream of said opening, the upstream end of said sleeve in said latter position being inwardly spaced from the wall of said nozzle.

2. In a gas turbine power plant having an exhaust nozzle, the combination of a sleeve closely fitting in said nozzle and movable between extended and retracted positions, said sleeve cooperating with said nozzle to form a Borda mouthpiece when said sleeve is retracted.

3. In a gas turbine power plant, an exhaust nozzle, said nozzle terminating in an exhaust opening, means for varying the effective area of said opening while maintaining the actual area substantially constant comprising a sleeve closely fitting and movable within said nozzle, said sleeve being located along the axis of the nozzle with at least a portion of the sleeve adjacent the trailing edge, the cross-sectional area of the sleeve at its trailing edge being equal to the cross-sectional area of said nozzle at its trailing edge, and means for moving said sleeve between an aft extended position wherein the stream is flowing full through said opening and an upstream position within said nozzle whereby a vena contracta is formed in the exhaust stream adjacent said opening.

4. In a gas turbine power plant having an exhaust nozzle, said nozzle terminating in an opening smaller than the dimension of the nozzle upstream of said opening, means for varying the effective area of the nozzle opening while maintaining the actual area substantially constant including an annular member carried within said nozzle, said member being located along the axis of the nozzle with at least a portion of the sleeve adjacent the trailing edge, the cross-sectional area of the sleeve at its trailing edge being equal to the cross-sectional area of said nozzle at its trailing edge, and means for moving said member along the axis of flow between a position where it is axially spaced from said opening and a position where it is in juxtaposed relation to said opening.

5. In a gas turbine power plant having an exhaust nozzle, said nozzle converging in a downstream direction and terminating in a trailing edge, the combination of means for varying the effective area of said nozzle while maintaining the actual area thereof substantially constant comprising a sleeve movable within said nozzle and located along the axis of said nozzle with at least a portion of the sleeve adjacent said trailing edge, the cross-sectional area of said sleeve at its trailing edge being substantially equal to the cross sectional area of said nozzle at its trailing edge, and means for moving said sleeve along the axis of flow.

References Cited in the file of this patent

UNITED STATES PATENTS

| | | |
|---|---|---|
| 2,479,776 | Price | Aug. 23, 1949 |
| 2,487,588 | Price | Nov. 8, 1949 |
| 2,501,633 | Price | Mar. 21, 1950 |
| 2,563,745 | Price | Aug. 7, 1951 |
| 2,575,735 | Servanty | Nov. 20, 1951 |

FOREIGN PATENTS

| | | |
|---|---|---|
| 622,348 | Great Britain | Apr. 29, 1949 |